United States Patent [19]

Miller et al.

[11] 4,100,791

[45] Jul. 18, 1978

[54] AUTO-LEVELER

[75] Inventors: George J. Miller; Kenneth G. Lytton; James E. Donnelly, all of Gastonia, N.C.

[73] Assignee: Fiber Controls Corporation, Gastonia, N.C.

[21] Appl. No.: 792,765

[22] Filed: May 2, 1977

[51] Int. Cl.² .......................................... G01B 13/08
[52] U.S. Cl. ...................................... 73/37.7; 73/160
[58] Field of Search ................... 73/37.7, 37.6, 37.5, 73/160

[56] References Cited

U.S. PATENT DOCUMENTS

| | | | |
|---|---|---|---|
| 2,843,882 | 7/1958 | Lewis et al. | 73/37.7 X |
| 3,154,810 | 11/1964 | Horne | 73/37.7 X |
| 3,283,564 | 11/1966 | Biddison, Jr. | 73/37.7 |
| 3,435,673 | 4/1969 | Felix | 73/37.7 X |
| 3,710,421 | 1/1973 | Tooka | 73/37.7 X |
| 3,752,170 | 8/1973 | Murbach | 73/37.7 X |

Primary Examiner—Richard C. Queisser
Assistant Examiner—Joseph W. Roskos
Attorney, Agent, or Firm—Cushman, Darby & Cushman

[57] ABSTRACT

An apparatus for producing an electrical output signal which varies as a function of sliver thickness with a trumpet having a bore through which the sliver passes and a port opening into the bore, and a sensor with a housing defining an inner space sealingly divided by a flexible diaphragm into an upper compartment and a lower averaging compartment. The lower compartment is connected to the trumpet port and to a pressure source via a metering valve having an air escape port. A shaft is fixed for movement vertically with the diaphragm and has a weight on the end within the lower compartment and a magnetic portion in the upper compartment. Vertical movement of the diaphragm caused by a change in back pressure caused in turn by a change in sliver thickness produces an electrical signal in a coil wound about the shaft in the upper compartment as the coil interacts with the magnetic portion.

5 Claims, 2 Drawing Figures

AUTO-LEVELER

BRIEF DESCRIPTION OF THE BACKGROUND OF THE INVENTION AND SUMMARY OF THE INVENTION

The invention relates to an improved apparatus for producing an output signal indicating the thickness or density of sliver strands produced by textile machines such as cards and the like.

One step in the processing of textile fibers such as cotton, wool, synthetic fibers, or any other type of textile fibers is forming these small fibers into a long interlocked chain known in the art as a sliver. This function is usually accomplished by a machine termed a card, but other textile processing equipment such as draw frames and pin drafters also produce slivers. These slivers are conventionally coiled or otherwise stored for further processing into textile yarn or thread which can be then woven or otherwise manipulated into textile material.

It is important that the density or thickness of the sliver be maintained substantially uniform. In the absence of monitoring of this thickness or density, the sliver density has a tendency to drift away from a desired value, thus producing a product which is unsatisfactory for further processing. In view of the speed of operation of modern carding machines, it is virtually impossible for visual observation or periodic manual testing to satisfactorily maintain a desired density.

Thickness regulating devices, commonly known by the term "auto-levelers", are well known in the textile art and have been successfully employed for many years. For example, an auto-leveler manufactured by Crosrol includes a first roller having a groove in the outer peripheral surface thereof in which a second roller rides. Strands produced by a carding machine, after being formed into a sliver, continuingly pass between the two rollers so that the movements of the roller riding in the groove vary as a function of the thickness and density of the sliver. These movements are detected to produce an electrical signal which is integrated and compared electrically with a desired value to control the relative speeds of the doffer and feed rolls of the card machine which in turn controls the sliver density.

British Pat. No. 930,873 describes another textile processing system of this type in which the sliver moves between two rollers with the movement of a second roller on top of the sliver being detected to vary the relative speeds of doffer and feed rolls. In this British patent, a magnet core is mechanically connected to the upper roller and disposed between a primary transformer winding and a pair of secondary windings so that the relative position of the core determines the voltages which appear at the two secondary windings. These secondary windings are in turn used to control a variable speed device which is applied to the feed element of the card machine.

U.S. Pat. No. 3,938,223 describes an apparatus in which the thickness and density of a sliver continuously passing between a rotating grooved roller and a sensor roller riding on the sliver is detected by movement of a magnet core coupled for movement with the upper roller and which is disposed for alternating the coupling between primary and secondary coils of a transformer. Preferably, the transformer includes first and second secondary coils so that the amplitudes of the respective output voltages of these coils are directly related to the position of the core and accordingly, the thickness of the sliver. The signals produced by the two secondary coils are delayed in time by a simple integration circuit to avoid changes in density resulting from detecting a minor irregularity in the sliver and applied to a first differential amplifier which produces an output voltage which varies as a function of the difference between the two input signals.

The output voltage is in turn applied to a second differential amplifier which is periodically rendered operative by a pulse generator for a short period. The other input to the second amplifier is used to adjust the desired sliver thickness. When the second amplifier is activated, an amplified signal is applied to a pair of relays, one responsive to positive excursions of the waveform and the other responsive to negative excursions. Each of these relays operates a controlled switch which, when the relays are activated, completes a current path through a coil of a conventional control device which operates an armature to control a variable speed device connected to one of the two rollers which control the thickness of the sliver, for example, the feed roll on a conventional card.

Auto-levelers have also detected the thickness of a sliver by impinging an air stream onto the sliver as it passes through a trumpet. U.S. Pat. No. 3,710,421 shows one such system in which the back pressure produced by impingement is detected by a pair of interconnected bellows. One of the difficulties with such dual bellow systems is an hysteresis effect in which different pressures are required for movement in opposite directions.

The present invention is a simple and unique apparatus with a trumpet member having a bore extending therethrough through which the sliver passes and a port opening into that bore. The port is connected to a pressure source via an inner bottom averaging compartment of a sensor and a fine metering valve with an air escape port at its outlet. The sensor housing defines an interior space divided by a flexible diaphragm into the lower averaging compartment and an upper compartment at atmospheric pressure. A shaft is fixed to the diaphragm for movement therewith in the lower compartment. A heavy weight which normally rests on the housing floor is fixed to the diaphragm and shaft and in the upper compartment the shaft has a magnetic portion which interacts with a coil wound about the shaft in the upper compartment to produce a signal indicating a change in back pressure in the lower compartment and hence a change in sliver thickness.

The lower averaging compartment thus minimizes oscillation due to fluctuations in thickness or air pressure. Further, the weight defines a substantially constant force which does not require either calibration or recalibration.

Other objects and purposes of the invention will be clear from the following detailed description of the drawings.

DETAILED DESCRIPTION OF THE DRAWINGS

Figure 1:
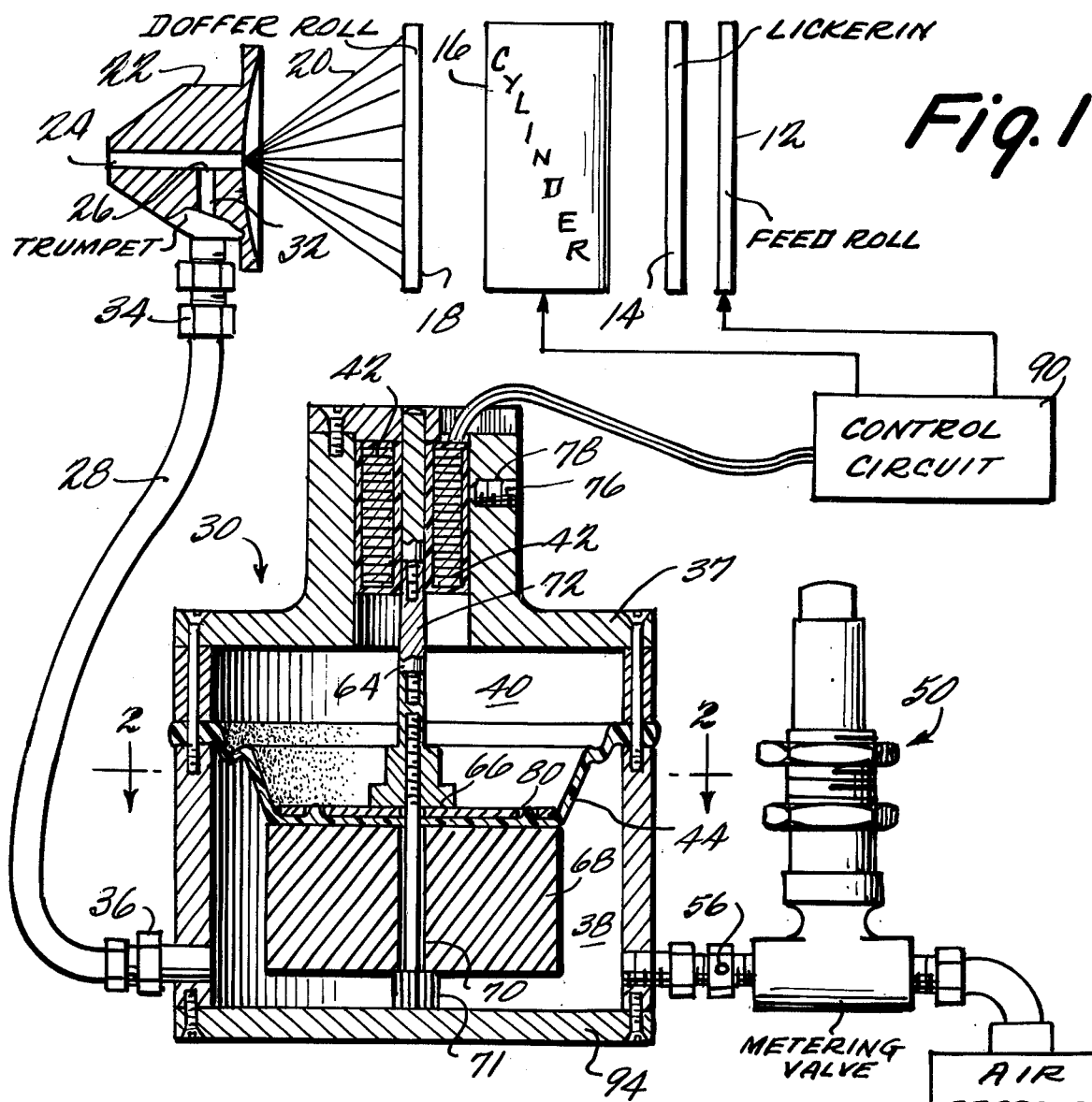
FIG. 1 shows a view of the present invention connected in a schematically illustrated carding machine with the sensor and trumpet shown in cross-section.
Figure 2:
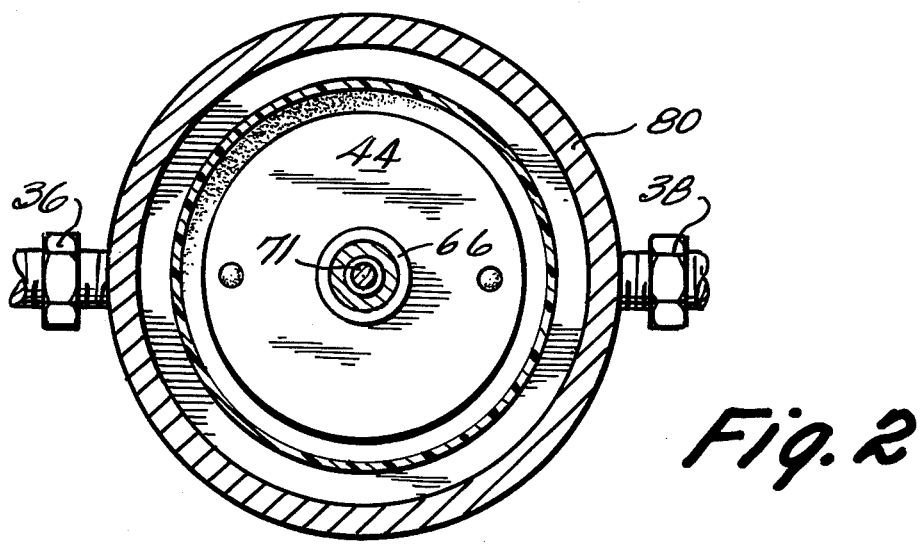
FIG. 2 shows a sectional view of the sensor in FIG. 1 along the lines 2—2.

Reference is now made to FIGS. 1 and 2 which illustrate a first embodiment of the present invention. The present invention is shown in FIG. 1 connected as part of a schematically illustrated carding machine, and it will be appreciated that the respective sizes of the elements constituting the present invention and the elements of the schematically illustrated carding machine have been greatly distorted for purposes of illustration. It should be further understood that while the present invention finds particular utility in use with a conventional carding machine, the invention also finds utility in conjunction with operation of any type of textile processing equipment that produces slivers.

The carding machine illustrated in FIG. 1, e.g., may be of any suitable type and is accordingly provided with the usual feed roll 12, lickerin 14, large fiber paralleling cylinder 16 and conventional doffer roller 18. As is wellknown, roll 18 doffs cylinder 16 to remove therefrom a fine web of parallel strands. These parallel strands are brought together as a web 20 by a trumpet 22 which has a bore 24 extending therethrough. Trumpet 22 in FIG. 1 is shown in section. The strand of fibers leaving bore 24 is taken to a sliver coiler or other conventional equipment.

As discussed briefly above, it is necessary to maintain the density or thickness of the sliver within a desired range. This is accomplished in the present invention by sensing the back pressure of air, some of which escapes into bore 24 through port 26 from line 28 which is connected to a back pressure sensor 30. Port 26, may, e.g., be 5/64 inch in diameter, and is connected to line 28 via a second bore 32 which extends into trumpet 22 transverse to bore 24. Line 28 includes conventional connections indicated as 34 and 36 and may also include any conventional flexible tubing suitable for operation at pressures such as described below.

Line 28 is connected to an inner space within cylindrical housing 37 of sensor 30. The inner space is divided into a lower compartment 38 which provides an "averaging" function as discussed below and an upper compartment 40 which is preferably at atmospheric pressure, e.g., by a path which extends through or around the coil 42 as will be discussed below. Compartments 38 and 40 are separated by a flexible diaphragm 44 which may be made of neoprene rubber or any other suitable material and which sealingly separates the compartments.

Air under pressure, e.g., at 40 psi is supplied to a metering valve 50 from source 52 which may be any conventional source of air pressure. Metering valve 50 similarly may be any convnetional metering valve of this sort. A valve sold by the Nupro Company as part of the "S" series of very fine metering valves has been found to be particularly satisfactory. At the outlet of metering valve 50, an air escape port 56 is provided through which most of the pressure from source 52 escapes to the atmosphere leaving, e.g., a pressure of 0.4 psi for the air entering the lower compartment 38 and moving from there through line 28 and bore 32 to escape through port 26. Air escape port 56 prevents the diaphragm from being over-sensitive to changes in sliver thickness and also minimizes the flow rate through the port 26 into bore 24.

A shaft 64 extends through diaphragm 30 and has a coupling connection 66 at one end to a weight 68 which, e.g., may be a cylindrically shaped lead weight. Weight 68 has a bore 70 extending therethrough through which a conventional screw 71 extends to engage the threaded coupling 66. Shaft 64 extends upward from flexible diaphragm 44 and mounts adjacent the other end thereof a portion 72, which is magnetic. Portion 72 interacts with coil 42 wound about the shaft 64 and held in place by set screw 76 extending through a bore 78 in the exterior housing 77 of sensor 30.

Shaft 64 is fixed to diaphragm 44 for vertical movement therewith by a metal plate 80 which engages projections of diaphragm 44 so that upward movement of diaphragm 44 in response to changes in pressure within compartment 38 caused by variations in density or thickness of the sliver passing through bore 24 shifts the position of magnetic portion 72 and thus causes the coil 42 to produce an electrical signal which is applied to control circuit 90. The lower compartment 38, however, averages fluctuations in pressure to prevent oscillation of the system from transient pressure and thickness changes.

Control circuit 90 may be any conventional circuit, e.g., a circuit of the type described in U.S. Pat. No. 3,938,223 or the circuit described in the co-pending application by Karl Grice entitled SLIVER CONTROL CIRCUIT, Ser. No. 793,759, (Fiber Controls Dkt. 91), filed May 4, 1977. The disclosure of this co-pending, commonly assigned patent application is incorporated herein by reference. Control circuit 90 generally operates to control the respective speeds of operation of speed roll 12 and cylinder 16 so as to maintain the sliver thickness as it passes through bore 24 within a desired range.

Lead weight 68 normally rests on the floor 94 of housing 37 and ensures that a given force produced by a given back pressure in turn caused by a given sliver thickness will always produce the same upward movement of the shaft 64, since the force required to lift the weight 68 will always be virtually the same. Further, in contrast with a spring, no change in reaction occurs with time so calibration and recalibration is unnecessary.

Many changes and modifications in the above-described embodiment of the invention can, of course, be carried out without departing from the scope thereof. Accordingly, that scope is intended to be limited only by the scope of the appended claims.

What is claimed is:

1. An apparatus for producing an electrical output signal which varies as a function of the thickness of a sliver of textile fibers comprising:

a first member having a bore extending therethrough through which said sliver travels and a port opening into said bore;

a valve member having an input for receiving pressurized air, an outlet for said pressurized air and means defining an escape port through which pressurized air escapes from said outlet to the atmosphere;

a hollow housing sensor means including a housing member defining an inner space, a flexible diaphragm dividing said inner space into a lower averaging compartment and an upper compartment, means for connecting said lower compartment to said outlet of said valve member and to said port of said first member, a shaft fixed to said diaphragm for vertical movement with said diaphragm in response to changes of pressure in said lower compartment resulting from changes in thickness of said sliver passing through said bore, said shaft having a magnetic portion in said upper compartment, a weight member fixed to said shaft and located in said lower compartment for urging said diaphragm and shaft downward, and at least one coil wound about said shaft in said upper compartment so that vertical movements of said shaft produce said output signal in said coil as said magnetic portion moves with respect to said coil.

2. An apparatus as in claim 1 wherein said valve member is a fine metering valve.

3. An apparatus as in claim 1 wherein said housing member is cylindrical in cross section.

4. An apparatus as in claim 3 wherein said coil is adjustably fixed in a cylindrical space by a set screw threadingly extending through said housing member.

5. An apparatus as in claim 1 wherein said first member has a trumpet shape, and has a second bore terminating in said port and extending transverse to the first bore.

* * * * *